Jan. 16, 1968  N. H. SCOTT  3,363,570
TANK FILLING SYSTEM
Filed Aug. 23, 1965  2 Sheets-Sheet 1

INVENTOR:
Norman H. Scott
BY:
James R. Hoatson Jr.
William H. Page II
ATTORNEYS

Jan. 16, 1968    N. H. SCOTT    3,363,570
TANK FILLING SYSTEM

Filed Aug. 23, 1965    2 Sheets-Sheet 2

INVENTOR:
Norman H. Scott

BY: James R. Hootson Jr.
William H. Page II
ATTORNEYS

United States Patent Office 3,363,570
Patented Jan. 16, 1968

3,363,570
TANK FILLING SYSTEM
Norman H. Scott, Villa Park, Ill., assignor to Universal Oil Products Company, Des Plaines, Ill., a corporation of Delaware
Filed Aug. 23, 1965, Ser. No. 481,807
8 Claims. (Cl. 103—6)

ABSTRACT OF THE DISCLOSURE

An automatic shutdown filling system for gas blanketed liquid storage tanks. A regulated gas blanketing supply is connected to the storage tank through a capillary restriction probe, the lower end of which terminates within the upper portion of the tank. As the tank is being filled (by a high capacity filling pump), the displaced blanketing gas readily escapes through the restriction probe, and the tank pressure does not increase appreciably. But when the rising liquid level reaches the tip of the probe, gas outflow is blocked and liquid outflow is substantially impeded. Hence the tank pressure quickly rises by compression of the resulting trapped gas pocket, and a pressure switch shuts down the filling pump.

---

This invention relates to apparatus for automatically filling gas-blanketed liquid storage tanks and other closed vessels to a predetermined level. More particularly, the present invention is directed to improvements in tank filling systems which incorporate a pressure-sensitive automatic shutoff device in combination with means for generating a discontinuous pressure signal upon attaining the desired liquid inventory within the tank. My invention is especially designed for, but is not limited to, use in conjunction with small volume, gas-blanketed vessels serving as hydrocarbon or chemical storage and charge tanks in pilot plant process units.

Charge tanks for pilot plant units are commonly mounted on a scale or balance in order that the quantity of charge stock may be accurately measured prior to the start of a run as well as periodically during the course of a run. Before a run is commenced, the tank is filled with sufficient charge material to last the anticipated length of the run, and it is customary to perform such filling rather rapidly with a high capacity pump. Manual supervision of the filling operation requires close operator attention in order to avoid overfilling, spilling, or contamination of the gas blanketing system. While it has been considered advantageous to provide automatic control means for regulating or programing the filling operation, convention level instrumentation has proven unsatisfactory for several reasons. Float type level instruments are too costly, bulky and cumbersome in relation to the investment in and size of the charge tank, and the additional dead weight or tare reduces the sensitivity and accuracy of the scale. An air bubbler dip tube system often cannot be used because the air would oxidize or otherwise contaminate the charge stock; even substituting an inert gas, such as nitrogen, for the air is not a satisfactory solution because of the large volume of inert gas required to be expended as well as excessive amounts of inert gas going into solution and contaminating the charge stock. A constant mass gas dome-pressure switch arrangement is not feasible because, for reasonable pressure swings, only a small proportion of the total tank volume can be utilized between successive filling cycles. In addition, the use of a constant mass gas dome requires that the liquid contents of the tank be subjected to substantial superatmospheric pressure for a prolonged period of time, resulting in excessive contamination of the charge stock by dissolved gas. Furthermore, successive fillings will potentially cause the constant mass gas phase to dissolve in the liquid, eventually eliminating the gas phase, or the pressure in the tank to go subatmospheric as the liquid is removed.

It is, therefore, an object of this invention to provide an inexpensive, light weight and easily fabricated device to detect attainment of a predetermined liquid level within a closed gas-blanketed tank.

Another object of the present invention is to utilize a pressure responsive switching element as a liquid level transducer for effecting automatic shutdown of the tank filling means.

A further object of the invention is to provide a vessel filling system wherein the vessel contents remain under substantially constant gas-blanketing pressure throughout nearly the entirety of the filling operation.

My invention involves the use of a variable mass-constant pressure gas dome, as distinguished from the constant mass-variable pressure gas dome known to the prior art. The charge tank is provided with a liquid inlet conduit or filling line which is connected to the discharge side of a relatively high capacity transfer pump taking suction from a main stock tank. A source of blanketing gas is placed in fluid communication with the upper interior portion of the charge tank through a flow restriction conduit. Such flow restriction conduit may include one or more spaced restriction orifices or needle valves, or it may contain a tightly packed elongate bed of subdivided particles; preferably, however, the flow restriction conduit comprises or consists of a fairly long length of fine bore capillary tubing. Whatever its mechanical construction, the restriction conduit is so sized that it will pass, with a low pressure drop, a flow of blanketing gas volumetrically equivalent to the liquid flow entering the tank through the filling line, but it will pass the same flow of said liquid only at a very high pressure drop. The lower end or tip of the restriction conduit is spaced a predetermined distance above the bottom of the tank. As the tank is being filled, the blanketing gas is readily displaced through the restriction conduit into the blanketing gas supply system. The pocket or dome of gas therefore decreases steadily in volume but undergoes no appreciable increase in pressure until the rising liquid level reaches the tip of the restriction conduit. At this point liquid begins to enter the restriction conduit and seals the remaining small volume of gas from further outflow. However, because of the high resistance of the restriction conduit to liquid flow, the conduit behaves as though it were practically blocked off and very little liquid is able to escape therethrough. Meanwhile, the liquid level continues to build within the tank, compressing the remaining pocket of gas and resulting in a rapid pressure increase in the vessel as well as in the filling line. A pressure switch connecting with the vessel or with the filling line, activated when a predetermined high pressure is reached, thereupon shuts down the transfer pump and ends the filling operation.

The construction and operation of the various embodiments of the invention are more particularly described in connection with the accompanying drawings in which.

Figure 1:
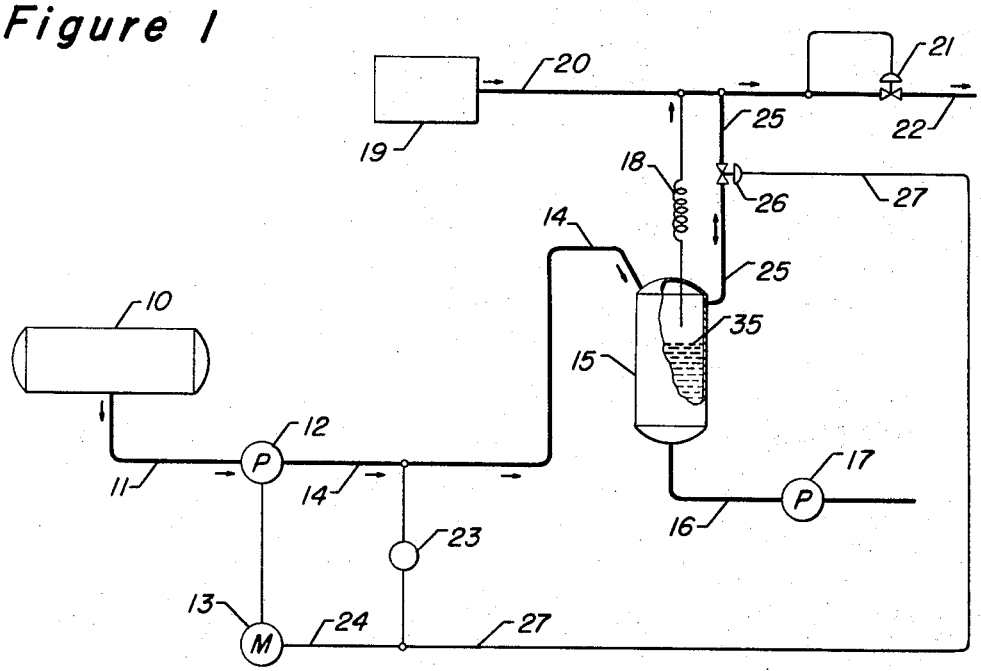
FIGURE 1 is a simplified flow diagram of a charge tank and filling system therefor.

In FIGURE 1 there is shown a main storage tank 10 containing a large volume of liquid charge stock; this storage tank is usually remotely located, as in a tank farm or supply shed. A transfer pump 12, driven by an electric motor 13 mechanically coupled thereto as by a direct shaft connection, takes suction from tank 10 through line 11. Pump 12 discharges into a filling or inlet line 14 which connects with a vertical charge tank 15 through the top head thereof; if desired, line 14 may instead be connected through the vertical wall or the bottom of tank 15. The charge tank 15 is a closed vessel, except for the several conduits connecting therewith, adapted to withstand superatmospheric pressure. For pilot plant or semiworks duty, tank 15 will generally be mounted on, or hung from, a weighing scale, balance, a load cell, or some other weighing device (not illustrated). A fresh feed pump 17, taking suction from charge tank 15 through line 16, provides a metered or controlled flow of charge stock to a process unit. The capacity of pump 17 is usually much smaller than that of transfer pump 12, whereby tank 15 can be filled in a matter of seconds or minutes but can provide charge stock for a period of days or weeks without refilling. A source or reservoir 19 of blanketing gas, which may be a nitrogen cylinder or fuel gas header, for example, is piped to a header 20 in which the blanketing gas pressure is maintained at some positive pressure by a back pressure regulator 21 vented to the atmosphere or to a flare stack via line 22. Such blanketing gas pressure is generally in the range of ½"–10" $H_2O$, though pressures as high as 100 p.s.i.g. are not beyond the scope of this invention. A helically wound, elongated capillary bore restriction tube 18, connected to header 20, extends through the top head of tank 15 and terminates in the upper portion thereof.

A pressure switch 23, teed into filling line 14, is coupled via leadwires 24 to the control circuit of motor 13. Pressure switch 23 may be of the adjustable differential gap type set to trip in one direction upon increasing pressure to a predetermined high pressure and to trip in the other direction upon decreasing pressure to a predetermined low pressure. The switch comprises suitable contacts, either normally open or normally closed, which are operatively wired into the control circuit of motor 13 such that the motor and pump 12 are shut down upon occurrence of a predetermined overpressure condition in line 14. The control circuit of motor 13 may include a latching relay providing a manual start-automatic shutdown capability. Filling line 14 may include a check valve to prevent backflow of liquid therethrough when the pump is stopped.

Figure 2:
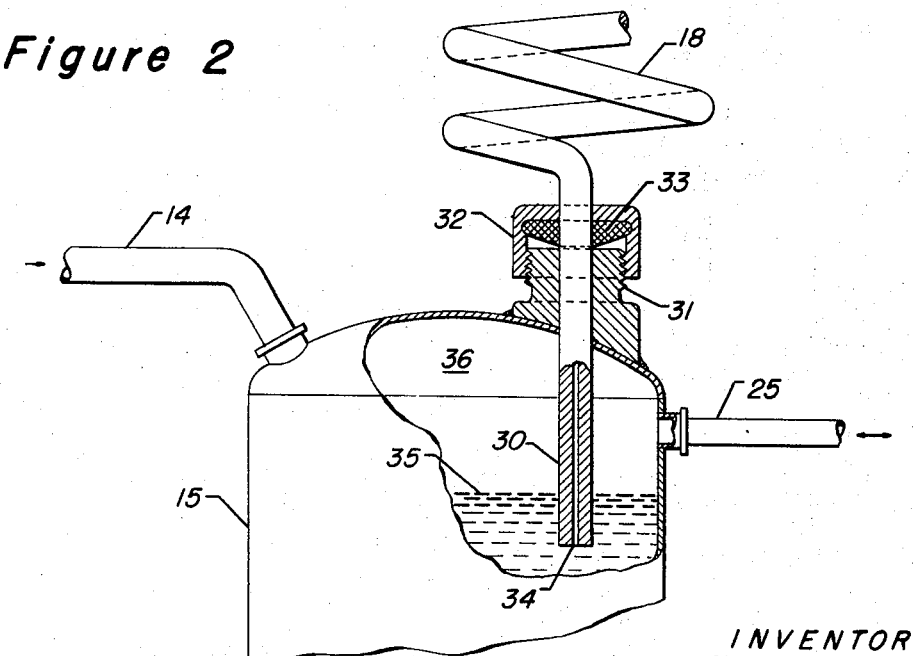
FIGURE 2 is an enlarged sectional elevation view of the charge tank and flow restriction conduit.

FIGURE 2 illustrates in greater detail a preferred arrangement of the restriction tube connection means including a disconnectable pressure seal fitting. The lower end portion of tube 18 is formed into a straight probe 30. Probe 30 is inserted into tank 15 through a threaded coupling 31. A mating threaded collar 32, acting through a conical annular gasket 33, compressively engages probe 30 to lock it in position and to effect a pressure tight seal therewith. By this means, the lower terminus or tip 34 of probe 30 may be raised or lowered as desired. As explained below, the elevation of tip 34 determines the maximum liquid level obtained within tank 15.

The operation of the system will be described in conjunction with FIGURES 1 and 2. Initially, tank 15 is empty of liquid and filled with blanketing gas from reservoir 19, header 20 and restriction tube 18 under a positive pressure of, for example, 2" $H_2O$. The trip-out pressure of switch 23 is set somewhat higher than the normal pressure prevailing in line 14 during the filling operation, which normal pressure is determined, of course, by frictional loss, liquid head and the blanketing gas pressure. The trip-out pressure should not be so high as to exceed the safe working pressure of tank 15, nor should it be so low as to cause premature shutdown of transfer pump 12 by spurious pressure variations. Motor 13 is manually or automatically started and liquid is pumped through filling line 14 into tank 15. The blanketing gas thereby displaced readily escapes through tube 18 with very little pressure increase in tank 15 since the restriction has been sized accordingly. When the liquid level 35 builds up to contact tip 34, the liquid is then forced up into the capillary bore of probe 30, effectively sealing the bore from further gas outflow. The rate of liquid outflow into tube 18 is very small, however, due to the relatively high resistance of the restriction tube to liquid flow compared to gas flow. Consequently, the liquid level continues to build above tip 34, adiabatically compressing the gas pocket 36 thereabove. When the gas pressure reaches a sufficiently high level, as for example 5–10 p.s.i.g., switch 23 trips out to shut off pump 12. The system can be designed to have any desired pressure sensitivity, defined as the rate of change of pressure with gas volume, $-dP/dV$, at the instant the level reaches the lower terminus of the capillary probe. The pressure sensitivity is a function of the adiabatic compressibility factor and initial pressure of the blanketing gas, as well as the volume of the tank above the probe tip, but is independent of the rate of liquid inflow. The system may also be designed to have a very small level overshoot, defined as the elevation of liquid level above the probe tip required to shut off the liquid inflow. The overshoot is the function of the above pressure sensitivity, the initial pressure, the trip-out pressure, the gas compressibility factor, and the cross-sectional area of the tank.

Figure 3:
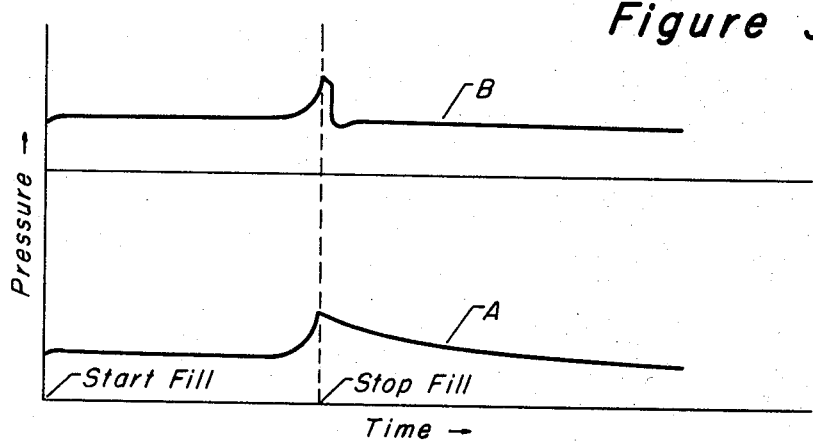
FIGURE 3 is a graph illustrating the pressure-time responses of different embodiments of the invention.

After transfer pump 12 is shut off, liquid will continue to enter tube 18 because of the continuing, although decaying, pressure differential thereacross, therefore, it is desirable to size the volume of tube 18 such that it will accommodate the maximum quantity of displaced liquid during the period of overpressure, or, alternatively to build in a wide spot in the line to accommodate the liquid after restriction tube 18. This feature will prevent contamination of the blanketing gas system which ordinarily supplies gas to many different charge tanks through a common header. In certain instances it will be desirable to reduce the period of overpressure to minimize dissolution of the blanketing gas in the liquid charge stock. Therefore there is provided, in FIGURE 1, a pressure relief bypass 25 connected in parallel with the restriction tube 18. A normally closed solenoid valve 26, serially connected into conduit 25, is actuated by current delivered by lead wires 27. Lead wires 27 may be connected to a second set of contacts in switch 23 timed to close a short interval after motor 13 is turned off, or lead wires 27 may be connected to auxiliary relay contacts in the motor control circuit. When the liquid inflow is halted in response to attaining the high pressure condition, valve 26 thereupon opens after a brief time delay to equalize the pressure in tank 15 and header 20. FIGURE 3 illustrates typical tank pressures prevailing during and following the filling operation. Curve A is the response of a system without a pressure relief bypass, while curve B is the response of a system with a pressure relief bypass.

Figure 4:
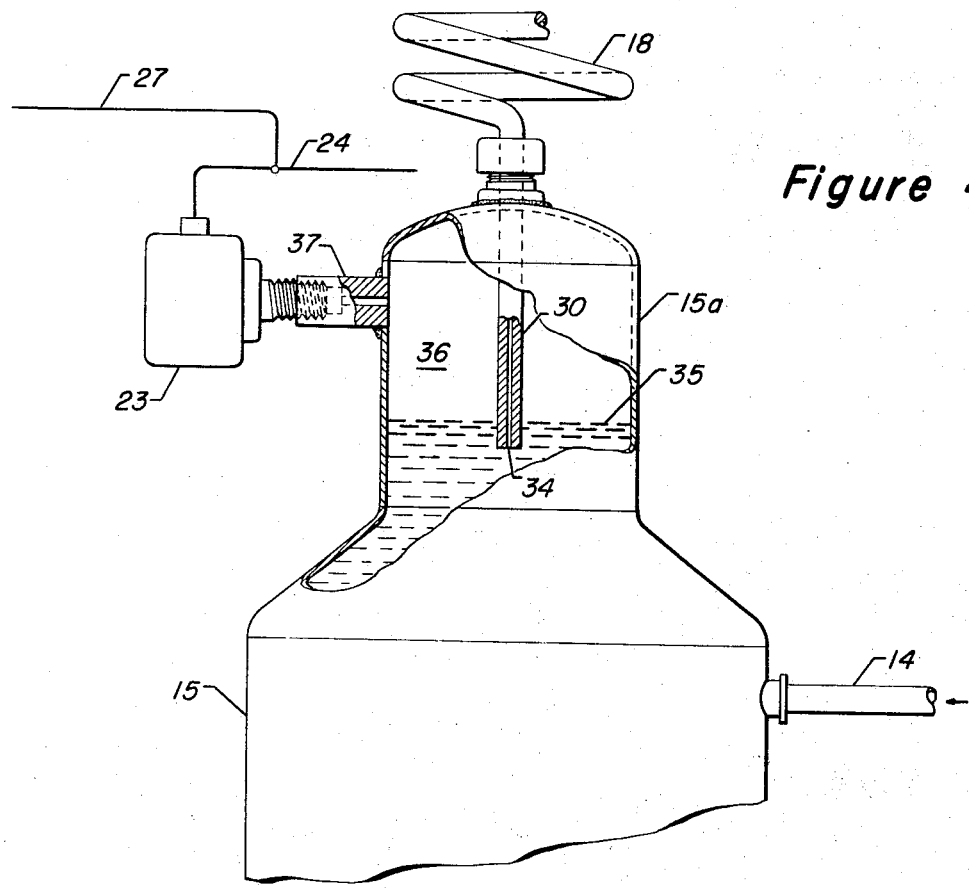
FIGURE 4 is an enlarged sectional elevation view of a modification of my invention.

As earlier indicated, it is possible to design the apparatus for increased pressure sensitivity. One means of doing this is shown in FIGURE 4 wherein the upper portion of tank 15 is swaged down to form a dome or restricted extension 15a surrounding the probe 30, thereby reducing the initial volume of gas pocket 36. Also, pressure switch 23 may be placed in direct fluid communication with gas pocket 36, as indicated in FIGURE 4, via a coupling 37.

Many alternate configurations of the above-described apparatus are included within the scope of the invention. In some applications, air will not be objectionable with respect to the charge and may therefore be utilized as a blanketing gas; in such cases, the constant pressure reservoir of blanketing gas is simply the surrounding atmosphere itself, the external end of the restriction tube opening directly into the atmosphere. The particular design of the transfer pump is not critical and such pump may be, for example, a centrifugal, reciprocating, gear, lobe or screw pump, etc. driven by an electric motor, turbine, or internal combustion engine. Liquid transfer means other than a mechanical pump may be utilized, such as a storage tank or a pressure tank, in which the driving force for the liquid inflow is provided by gravity and/or pressure. The means for shutting off the inflowing liquid may be a motor valve in the pump discharge line and/or a motor valve in a spillback line around the pump. The apparatus may further include a number of charge tanks to be filled in succession, whereby a high pressure shut off condition in one tank will divert the inflow to the next succeeding tank.

I claim as my invention:

1. A vessel filling system comprising:
    (1) a liquid-containing means including a closed vessel and an inlet conduit connecting with said vessel;
    (2) liquid transfer means for forcing liquid through said inlet conduit into said vessel;
    (3) a substantially constant pressure reservoir of blanketing gas disposed externally of said vessel;
    (4) a flow restriction conduit connecting with said reservoir and extending into and terminating within said vessel, the lower terminus of said restriction conduit being positioned to contact a rising liquid level within said vessel at an elevation between the top and bottom of the vessel, and said restriction conduit being sized to present low resistance to gas outflow and high resistance to a volumetrically equivalent liquid outflow;
    (5) a pressure responsive switching element connected to said liquid-containing means adapted to change state upon increasing pressure to a high pressure condition; and
    (6) means operatively coupling said switching element with said transfer means whereby the liquid inflow is terminated upon attainment of said high pressure condition.

2. The system of claim 1 further characterized in that said flow restriction conduit comprises a capillary tube.

3. The system of claim 1 further characterized in that said liquid transfer means is a pump.

4. The system of claim 1 further characterized in that said switching element is connected to said inlet conduit.

5. A vessel filling system comprising:
    (1) a liquid-containing means including a closed vessel, an inlet conduit connecting with said vessel, and a gas vent in the top of the vessel;
    (2) pumping means for forcing liquid through said inlet conduit into said vessel;
    (3) a prime mover mechanically coupled to said pumping means;
    (4) a substantially constant pressure reservoir of blanketing gas disposed externally of said vessel;
    (5) a flow restriction conduit comprising a capillary tube and connecting at one end thereof with said reservoir, the other end portion of said conduit defining a substantially straight probe extending vertically and sealably through said gas vent into said vessel and terminating in the upper portion thereof, the lower terminus of said probe being positioned to contact a rising liquid level within said vessel at an elevation between the top and bottom of the vessel, and said capillary tube being sized to present low resistance to gas outflow and high resistance to a volumetrically equivalent liquid outflow;
    (6) a pressure responsive switching element connected to said liquid-containing means adapted to change state upon increasing pressure to a high pressure condition; and
    (7) means operatively coupling said switching element with said prime mover whereby the prime mover and pumping means are shut down upon attainment of said high pressure condition.

6. The system of claim 5 further characterized in that said probe extends into said vessel through a disconnectable pressure seal fitting whereby the elevation of the lower terminus of the probe within the vessel may be adjusted.

7. The system of claim 5 further characterized in that said upper portion of the vessel is of reduced horizontal cross-sectional area in relation to the lower portion of the vessel.

8. The system of claim 5 further characterized in that a valved bypass conduit is connected in parallel with said restriction conduit connecting said vessel with said blanketing gas reservoir, the valve thereof being operatively connected to said switching element and opening upon or after shutdown of said pumping means whereby to reduce vessel pressure to the pressure of said gas reservoir.

References Cited
UNITED STATES PATENTS

| | | | |
|---|---|---|---|
| 2,445,437 | 7/1948 | Kellogg | 103—6 |
| 2,549,311 | 4/1951 | Hudson | 103—25 |
| 2,782,016 | 2/1957 | Iannelli | 137—213 |
| 2,909,187 | 10/1959 | Gillooly | 137—209 |
| 2,971,464 | 2/1961 | Stevens | 103—6 |

DONLEY J. STOCKING, Primary Examiner.

WILLIAM L. FREEH, Examiner.